(12) United States Patent
Sentmanat

(10) Patent No.: US 6,799,884 B2
(45) Date of Patent: Oct. 5, 2004

(54) DUAL CHAMBER ORIFICE MIXER AND METHOD OF USE

(75) Inventor: Martin Lamar Sentmanat, Akron, OH (US)

(73) Assignee: The Goodyear Tire and Rubber Company, Akron, OH (US)

( * ) Notice: Subject to any disclaimer, the term of this patent is extended or adjusted under 35 U.S.C. 154(b) by 33 days.

(21) Appl. No.: 10/329,247

(22) Filed: Dec. 23, 2002

(65) Prior Publication Data

US 2004/0120217 A1 Jun. 24, 2004

(51) Int. Cl.⁷ .................................................. B01F 5/06
(52) U.S. Cl. ...................... 366/176.3; 366/268; 366/269
(58) Field of Search ........................... 366/176.1–176.4, 366/267–269, 332–335

(56) References Cited

U.S. PATENT DOCUMENTS

| | | | |
|---|---|---|---|
| 49,345 A | | 8/1865 | Hervey |
| 3,353,918 A | * | 11/1967 | Philip |
| 3,860,218 A | | 1/1975 | Hurlimann |
| 4,334,787 A | | 6/1982 | Kluth et al. |
| 4,347,002 A | * | 8/1982 | Born |
| 4,463,875 A | * | 8/1984 | Tepic |
| 5,302,018 A | | 4/1994 | Maeda |
| 5,451,106 A | | 9/1995 | Nguyen et al. |
| 5,749,653 A | | 5/1998 | Kurtz |
| 5,823,671 A | | 10/1998 | Mitchell et al. |
| 6,062,722 A | | 5/2000 | Lake |
| 2004/0125690 A1 | * | 7/2004 | Sentmanat |

FOREIGN PATENT DOCUMENTS

| | | | |
|---|---|---|---|
| GB | 2048090 A | * | 12/1980 |
| JP | 6-170198 | | 6/1994 |
| WO | 92/09361 | * | 6/1992 |

* cited by examiner

Primary Examiner—Charles E. Cooley
(74) Attorney, Agent, or Firm—Howard M. Cohn

(57) ABSTRACT

A method and apparatus for mixing a polymer with an agglomerates of one or more compounds in a pair of opposed pressure cylinders with a nozzle block there between using moving the pistons to force the polymer with the agglomerates from pressure cylinders into the other and back so that the agglomerates are broken up and dispersed throughout the polymer.

10 Claims, 6 Drawing Sheets

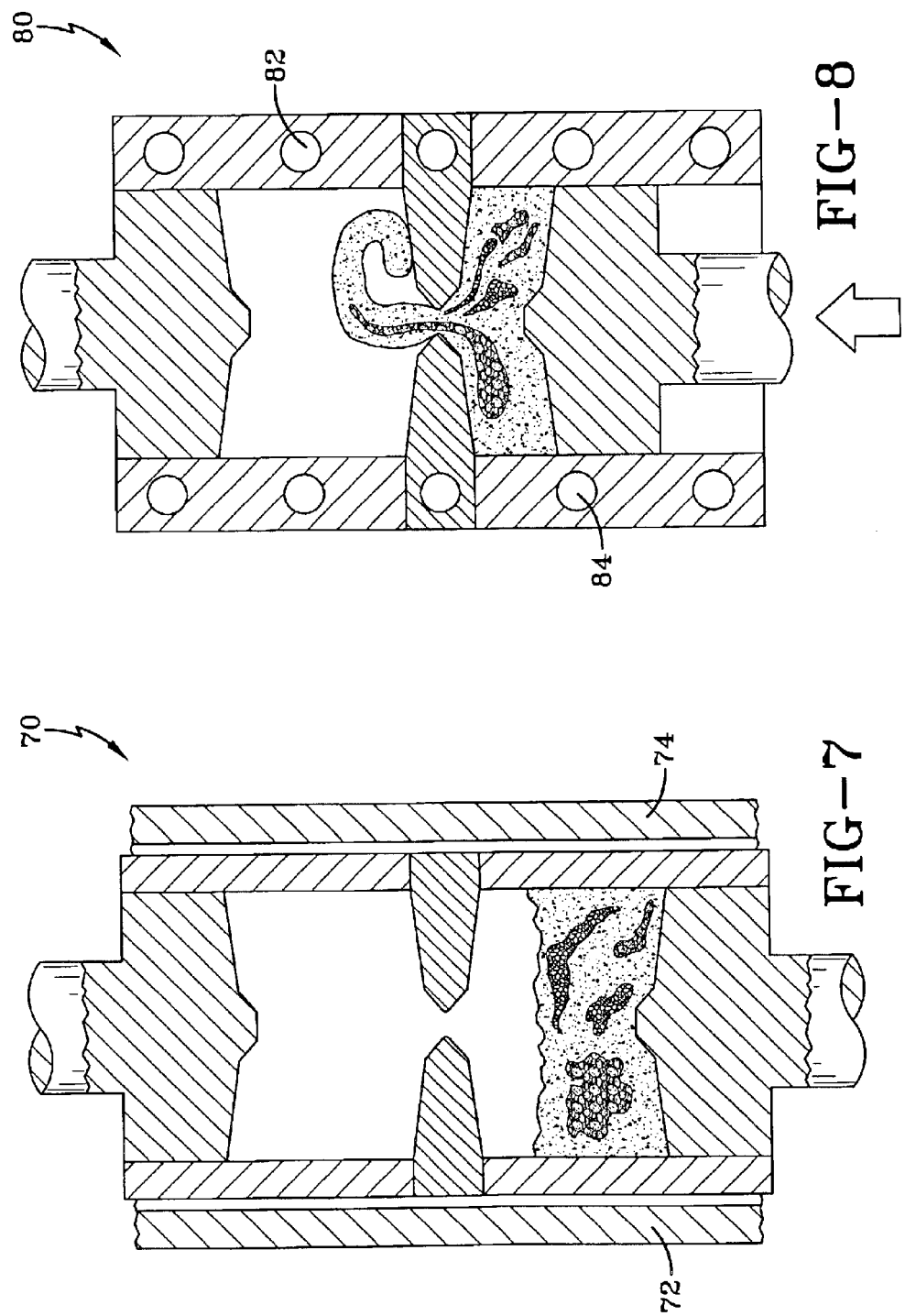

DUAL CHAMBER ORIFICE MIXER AND METHOD OF USE

TECHNICAL FIELD

The present invention relates to a method and apparatus to mix polymeric compounds, and more particularly to a method and apparatus to mix elastomers such as rubber with agglomerates of compounds such as carbon black whereby the agglomerates are broken up and dispersed throughout the elastomer.

BACKGROUND ART

Mixing apparatus and various types of treatment apparatus to treat macro molecular substances are known; one such apparatus utilizes a pair of essentially cylindrical compression cylinders which are separated by a nozzle block through which nozzle-shaped ducts pass. The treatment substance is included in the cylinders and pushed back and forth, through the apertures, to mix substances therein, or to treat substances by wall contact with the nozzle block.

In the specification and claims, the term "treatment" should be understood to mean a wide variety of operations and processes, and not only mixing. For example, other treatment processes may be plasticising, inter-mixing, adding and mixing, homogenizing, dispersing, separately or combined with further treatment operations such as addition of heat; removal of heat; extrusion through nozzles or constrictions; evaporation; vacuum treatment; or other treatment steps such as, for example, breakdown of macro molecular substances under increased pressure, for example gas pressure, linking, cross linking, or polymerization of substances and other process and treatment steps.

Various types of apparatus have been proposed in order to treat compositions of matter in accordance with the one or the other desired treatment operation. Most such apparatus have specific advantages, but also specific disadvantages, so that various treatment steps can be carried out only partially, or by use of expensive or uneconomical processes.

One type of well-known treatment apparatus is the so-called Banbury mill. A pair of steel rollers, the temperature of which can be controlled, is located to form a slot or nip therebetween and substances to be mixed are pulled or drawn through the slit between the rollers. Depending on the width of the slit, and the difference in circumferential speed of the rollers, the substances being pulled through the slit are stretched, sheared, or mixed more or less. Proper use of the machine requires skilled and attentive operators. Additionally, the process is difficult to control and output which is not properly mixed is frequent; the output must, therefore, be constantly tested. In spite of these disadvantages, and in spite of the high labor cost for a unit of mixed output, the open mixing roller-type mill apparatus is widely used, primarily due to its versatility and adaptability to various substances.

Single-chamber enclosed mixers, of the Banbury or Werner & Pfeiderer type use a closed chamber, in which the substance to be mixed is included. A pair of shafts with eccentrically located projections or lands pass through the chamber, so that the goods to be mixed are placed under shear stress. This apparatus permits high shearing speed to occur only at localized regions and no assurance is given that all particles are subjected to passage through a zone of high shearing speeds during a plurality of times, as is required for homogenizing. Additionally, the substances to be mixed experience a temperature rise so that high shearing stresses cannot be obtained, necessary for dispersions, due to the decrease of viscosity. Cooling the chamber itself usually is not sufficient to remove generated heat, since particularly macro molecular substances have a low heat conductivity. It is thus necessary to continuously peel off substance to be treated from the wall of the chamber. This peeling off of substance is carried out frequently only insufficiently. The chamber itself is subject to wear and tear and can be repaired, or serviced only in substantial intervals. In the meanwhile, the distance between a peeling apparatus and the wall of the chamber itself may become excessive. Increasing the temperature during treatment frequently is undesirable if components of the substance are heat sensitive; chemical reactions may result which may require that substance, which is not yet completely treated, must be removed from the enclosed mixer and immediately cooled, for example, by intermediate cooling on a cooling mill or roller. The mixing chamber should be completely full. Treatment in which various elements or components should be treated in sequential steps is difficult to be carried out since the quantities to be mixed have to be matched to the required mixing quantities, at any time during the steps, which interferes with economical operation of the system and the treatment method.

In U.S. Pat. No. 3,860,218 ('218) there is disclosed, for example, "a nozzle block, formed with at least one and preferably a plurality of parallel ducts is clamped between a pair of pressure cylinders, between which substances are pushed from one side of the block, through the block to the other. The cross section of the connecting duct, or ducts is selected, in accordance with the present invention, to be non-circular.

The nozzle block can readily be removed from its clamped position between the pressure cylinders and easily replaced. The connecting nozzles or ducts, between the pressure cylinders, can thus be designed to fit the desired process, and can be easily formed with necessary connections for cooling, heating, for the addition of test or sensing elements, and can be placed to be externally freely accessible."

Further there is disclosed, for example, in the '218 patent, "an apparatus to treat compositions of matter: and more particularly to mix macro molecular substances." The nozzle blocks disclosed in the '218 patent are "particularly designed to plasticise raw rubber." However, there is no teaching or suggestion in the '218 patent of mixing an elastomer with agglomerates of compounds whereby the agglomerates are broken up and dispersed through the elastomer.

SUMMARY OF THE INVENTION

According to the present invention, there is disclosed a method for mixing a polymer with an agglomerates of one or more compounds which comprises the steps of: disposing an amount of the polymer and an amount of the agglomerates of the one or more compounds into one of a pair of opposed pressure cylinders; providing a nozzle block located between the opposed pressure cylinders and being formed with at least one duct of non-circular cross section establishing communication between the cylinders; moving the pistons to force the polymer with the one or more agglomerates of the compound from the one of a pair of opposed pressure cylinders into the other opposed cylinder and back so that the agglomerates of the compound are broken up and dispersed throughout the polymer; and removing the polymer with the broken up agglomerates dispersed therethrough from one of the pair of opposed cylinders.

Further according to the present invention, the method includes the step of selecting the agglomerate from the group comprising carbon black, silica, clay, and talc and the polymer is selected from the group comprising elastomer, rubber and thermoplastic.

Also according to the present invention, the method includes the step of breaking up the agglomerates of the compound until at least about 90% of the agglomerates are at a size of less than about 26 microns. Preferably, the agglomerates of the compound are broken up until at least about 95% of the agglomerates are at a size of less than about 26 microns.

Still further according to the present invention, the method includes the step of breaking up the agglomerates of the compound until at least about 90% of the agglomerates are at a size of less than about 10 microns. Preferably, the agglomerates of the compound are broken until at least about 95% of the agglomerates are at a size to a size of less than about 10 microns.

According to the present invention, the method includes the step of disposing a ratio of about 10 parts of polymer to about 1 part of the agglomerates into the one of a pair of opposed pressure cylinders. Preferably, the method includes the step of disposing a ratio of up to 1 part of polymer to about 1 part of the agglomerates into the one of a pair of opposed pressure cylinders.

Also according to the present invention, an apparatus for mixing a mixture of a polymer with an agglomerates of one or more compounds is disclosed that comprises a pair of pressure chambers that are separated from each other by a nozzle block having a nozzle orifice, a piston reciprocally disposed in each of the pressure chambers to force the mixture from one of the pressure chambers through the nozzle orifice and into the other pressure chamber; each of the pistons having a forward surface with an outer portion of the surface disposed at an angle C of between about 0.5 degrees and about 40 degrees with respect to a line perpendicular line to a centerline extending through the pistons; the nozzle orifice having a material flow surface that extends on either side of the nozzle block from the orifice, the material flow surfaces extending at an angle A between about 0.5 degrees and about 40 degrees with respect to a line perpendicular line to a centerline extending through the pair of pressure chambers whereby the material flow surfaces abut against an entrance surface of the orifice.

Further according to the present invention, the nozzle orifice has an entrance surfaces between the material flow surfaces and through slots forming the orifice extending between the pressure chambers, wherein entrance surfaces form an angle B with respect to centerline, where angle B is between about 15 degrees and about 60 degrees.

Also according to the present invention, the outer portion of the surface of forward surfaces have a central protuberance shaped as a truncated cone with a flat outer face and a conically shaped wall that is disposed at an angle D between about 15 degrees and about 60 degrees.

Other objects, features and advantages of the invention will become apparent in light of the following description thereof.

BRIEF DESCRIPTION OF THE DRAWINGS

Reference will be made in detail to preferred embodiments of the invention, examples of which may be illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

The structure, operation, and advantages of the present preferred embodiment of the invention will become further apparent upon consideration of the following description taken in conjunction with the accompanying figures, wherein:

FIG. 7 illustrates an apparatus similar to FIG. 1 but with heating and cooling channels extending therethrough;

FIG. 8 illustrates an apparatus similar to FIG. 7 but with heating and cooling channels extending there through in a different orientation from those in FIG. 7;

DETAILED DESCRIPTION OF THE INVENTION

Figure 1:
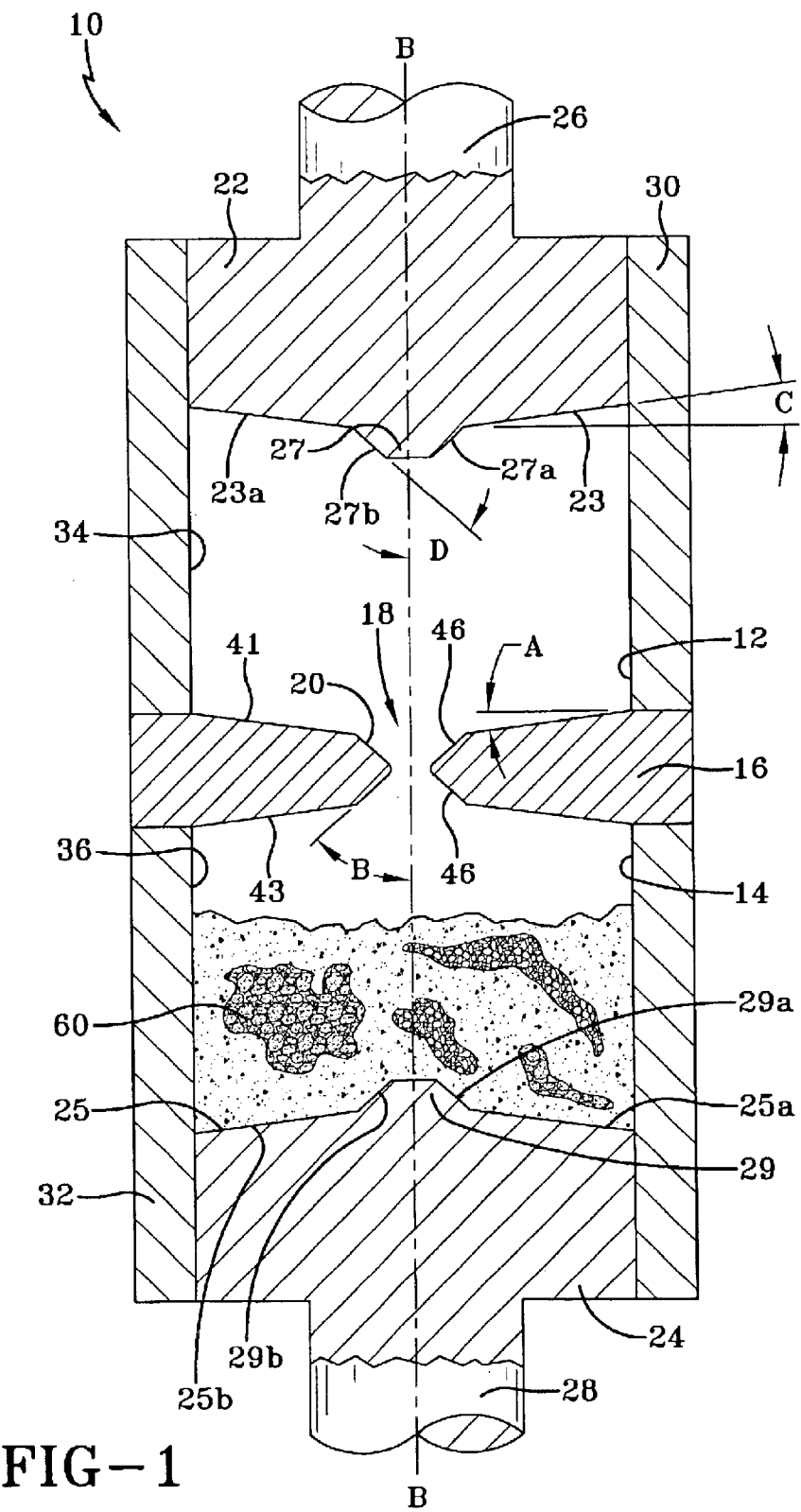
FIG. 1 is a longitudinal side view of a schematic representation of a dual chamber orifice mixing apparatus according to the present invention.

Referring to FIG. 1, there is shown a dual-chamber mixing apparatus 10 to mix a mixture of materials including an elastomer such as rubber with agglomerates of compounds such as carbon black whereby the agglomerates are broken up and dispersed throughout the elastomers.

The dual-chamber mixing apparatus 10 includes a pair of pressure chambers 12, 14 that are separated from each other by a nozzle block 16. The nozzle block 16 has a nozzle orifice 18 that includes one or more connecting channels 20 between the pressure chambers 12, 14, as discussed hereinafter. Disposed within each of the pressure chambers 12 and 14 is a piston 22 and 24, respectively, that are reciprocally moveably located therein. Each piston 22 and 24 is connected by a piston rod 26 and 28, respectively, to a power system, such as a hydraulic or pneumatic system (not shown), which reciprocate the pistons 22 and 24 in their respective pressure chambers 12,14 by means such as hydraulic pressure. The pressure chambers 12 and 14 are preferably formed of walls 30 and 32 that have inner cylindrical surfaces 34 and 36, respectively.

The pistons 22 and 24, disposed within each of the pressure chambers 12 and 14, respectively, are preferably of the same configuration. Each of the pistons 22 and 24, has a forward surface 23, 25, respectively, that forces the mixture of elastomer and compounds in one of the pressure chambers 12, 14, through the nozzle orifice 18 and into the other pressure chamber. The forward surface 23, 25 is shown with an outer portion of the surface 23a, 25a disposed at an angle C, where C is between about 0.5 degrees and about 40 degrees and preferably between about 0.5 degrees and about 10 degrees, with respect to a line perpendicular line to a centerline B—B extending through the pair of pressure chambers 12, 14 of mixing apparatus 10. The angle C of surface 23a, 25a, as seen in FIG. 1, is selected to correspond to the angle A of the material flow surfaces 41, 43, respectively, so that the mixture of elastomer and compounds is squeezed down the material flow surface 41, 43 of the nozzle block 16, as discussed in detail below, towards the entrance surfaces 46, 48, respectively, of the orifice 18. Besides the outer portion of the surface 23a, 25a of forward surfaces 23, 25, there is a central protuberance 27, 29 shaped as a truncated cone with a flat outer face 27a, 29a, respectively, and a conically shaped wall 27b, 29b that is disposed at an angle D, where D is between about 15 degrees and about 60 degrees and preferably between about 40 degrees and about 50 degrees, with respect to centerline B—B. The angle D of conical walls 27b, 29b from surface 23a, 25a to the flat outer faces 27a, 29a, respectively, is selected to correspond to the angle B of the entrance surfaces 46, 48, respectively, so that the mixture of elastomer and compounds is squeezed down the entrance surfaces 46, 48, respectively, and through the openings 52–58 of the orifice 18. While a truncated, conical shaped protuberance is shown, it is also within the terms of the present invention to form the protuberance as a cone or to form the forward surface 23, 25 without a protuberance.

Figure 4:
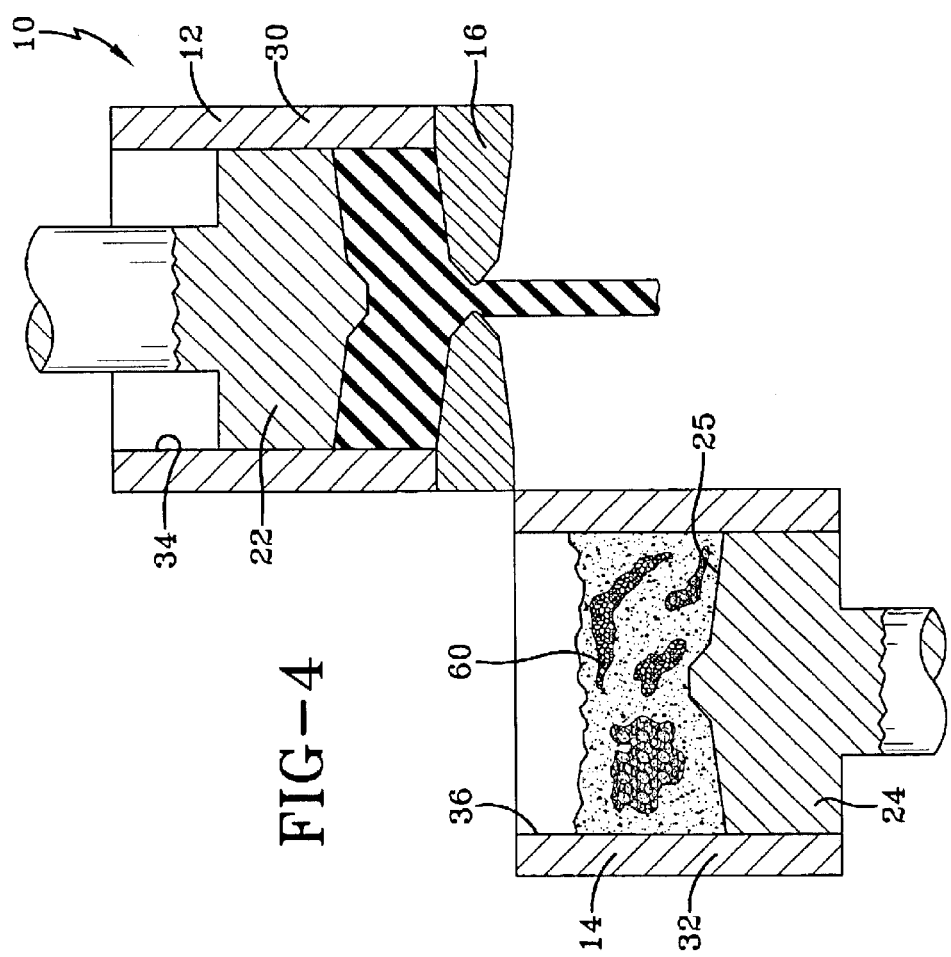
FIG. 4 is a schematic cross-sectional view illustrating the upper and lower chambers separated from each other so that the composition to be mixed can be placed in one chamber while the mixed composition can be discharged from the other chamber.

As shown in FIG. 4 and discussed in more detail below, the inside of the pressure chambers 12, 14 can be opened for filling with the material to be mixed by separating the upper and lower pressure chambers with respect to each other. This can be accomplished by means such as twisting them out of alignment with each other.

Figure 5:
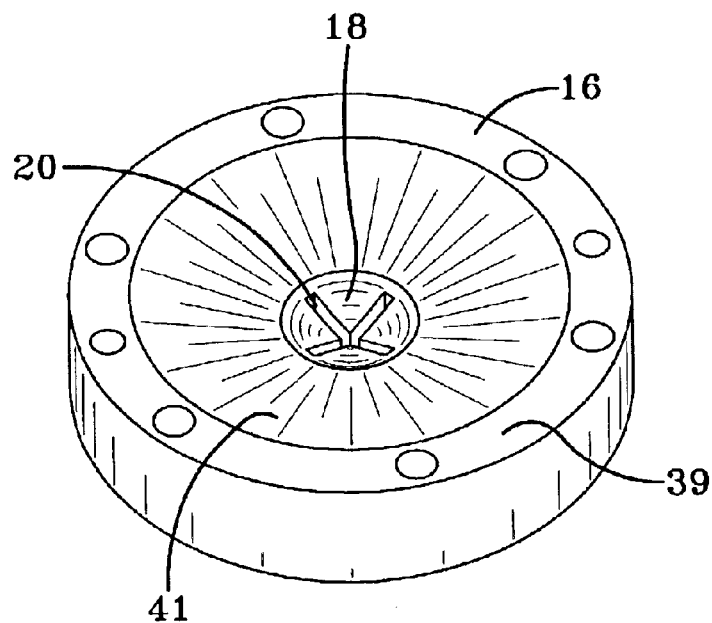
FIG. 5 shows an orifice plate with a single orifice extending therethrough.

Referring to FIG. 5, there is shown a perspective view of the nozzle block 16. The nozzle block 16 has a cylindrical wall 39 which secures the block between the cylindrical walls 30 and 32 of pressure chambers 12, 14. A material flow surface 41, 43 extends on either side of the nozzle block 16 from the cylindrical wall 39 to the orifice 18 to assist the movement of the mixture of elastomers with agglomerates of compounds from one of the pressure chambers through the nozzle orifice 18 and into the into the other pressure chamber. The material flow surfaces 41, 43 extend at an angle A, as shown in FIG. 1, where A is between about 0.5 degrees and about 40 degrees and preferably between about 0.5 degrees and about 10 degrees, with respect to a line perpendicular line to a centerline B—B extending through the pair of pressure chambers 12, 14 of mixing apparatus 10. The material flow surfaces 41, 43 abut against an entrance surface 46, 48, respectively, of the orifice 18. The entrance surfaces 46, 48, as shown in FIG. 1, form an angle B with respect to centerline B—B each other, where B is between about 15 degrees and about 60 degrees and preferably between about 40 degrees and about 50 degrees.

Figure 6:
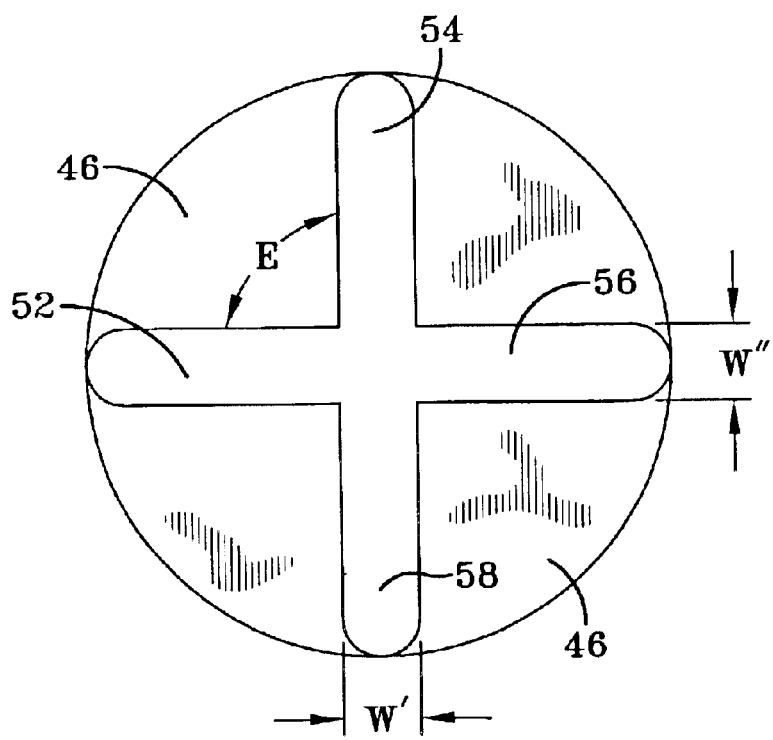
FIG. 6 shows an enlarged section of a portion of the orifice plate of FIG. 5.

As shown in FIG. 6, a top view of the nozzle orifice 18, through slots 52, 54, 56 and 58 (52–58) are separated from each other by an angle E, typically about 90 degrees. However, it is within the scope of the invention to use more or fewer slots and to change the angle between the slots. The width w', w" of the slots 52,56 and 54,58 is preferably equal to a dimensional ratio of the chamber diameter F to the width dimension equal to: 2:1 to a ratio of 100:1. However, it is within the scope of the invention to construct the through slots 52,56 and 54,58 of any desired width.

In operation, a polymeric fluid or compound, such as elastomer, rubber and thermoplastic is mixed with an agglomerate of a compound from the group comprising carbon black, silica, clay, and talc. The mixture 60 is disposed into one of a pair of opposed pressure chambers, such as the lower pressure chamber 14 of the dual-chamber mixing apparatus 10, as shown in FIG. 4. The amount of the polymer and compound mixture 60 being disposed in the pressure cylinder 14 is a ratio of up to 1 parts of polymer to about 1 part of the agglomerates of the compound. It is also within the terms of the invention to dispose a ratio of about 10 parts of polymer to about 1 part of the agglomerates into the one of a pair of opposed pressure cylinders.

At the same time, the completed mixture 60 of an elastomer with the agglomerates of the compound broken up and dispersed throughout the elastomer is ejected from the upper pressure chamber 12 through the nozzle block 16, as discussed below.

Figure 2:
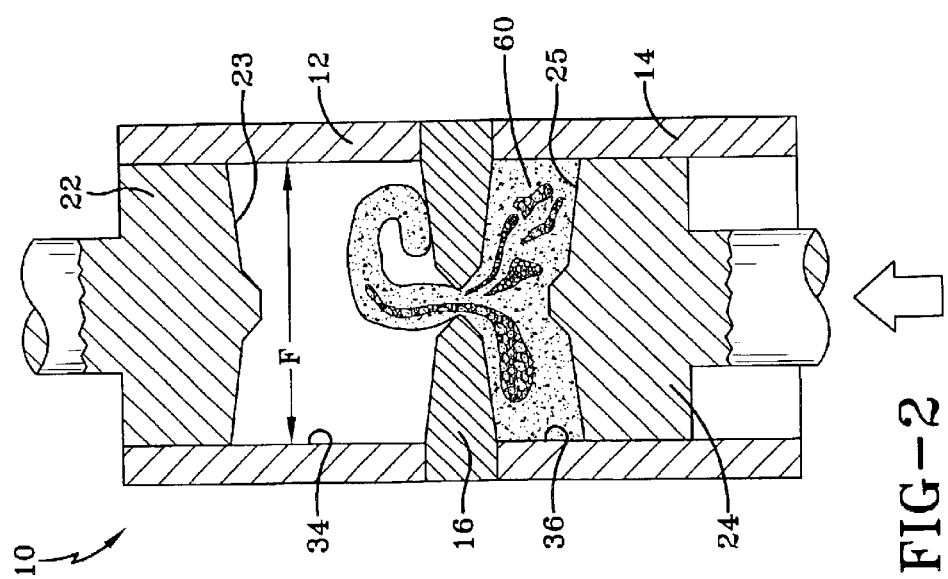
FIG. 2 is a schematic longitudinal sectional view of the apparatus of FIG. 1, showing the piston forcing the composition being mixed through an orifice opening.

Then, the upper and lower chambers 12, 14, respectively, are moved into alignment with each other and secured together with the nozzle block 16 therebetween. Next, the lower piston 24 is operated by the attached piston rod 28 to move the piston toward the nozzle block 16 so that the mixture 60 is forced against material flow surface 43. Then, as the material 60 continues to be pushed by the piston 24, the material is squeezed between the forward surface 25 and the material flow surface 43. With further movement of piston 24, the material 60 is squeezed between the entrance surface 48, respectively, of the orifice 18 and through the slots 52–58, as shown in FIG. 2. Finally the protuberance 29 moves into the entrance surface 48 and forces the remainder of the material through the slots 52–58, as shown in FIG. 3.

Figure 3:
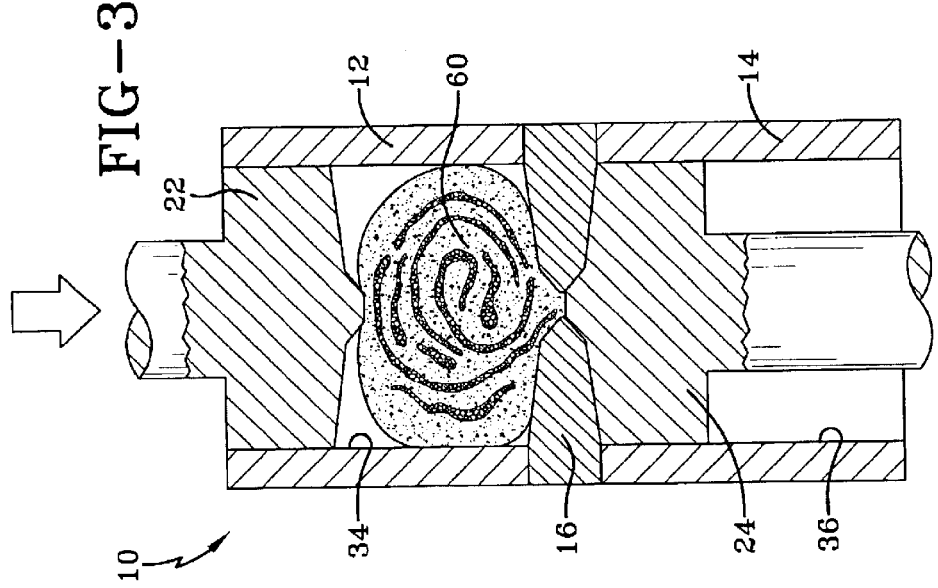
FIG. 3 is a schematic cross-sectional view of the apparatus of FIGS. 1 and 2 after all of the material has been forced from one chamber, through the orifice, and into the opposite chamber.

After the piston 24 has moved to the fullest extent into the orifice entrance 38, as shown in FIG. 3, the upper piston 22 moves toward the nozzle block 16 and forces the mixture 60, which is now located in the pressure chamber 12, to move back through the orifice plate 16 and into the lower chamber 14. This back and forth movement of the material 60 continues between the upper and lower pressure chambers 12, 14 until the agglomerates of the compound in the mixture 60 are broken until at least about 90% and preferably about 95% of the agglomerates are at a size of less than about 26 microns. More preferably, the agglomerates of the compound in the mixture 60 are broken until at least about 90% of the agglomerates are at a size of less than about 10 microns.

Once the desired consistency is reached, the mixture 60 is removed from the dual-chamber mixing apparatus 10, as shown in FIG. 4.

Referring to FIG. 7, there is illustrated an embodiment of the present invention, wherein the dual-chamber mixing apparatus 70 includes cooling or heating channels 72, 74, 75, that extend the length of the apparatus through which cooling or heating fluids may pass as required. Any number of conduits may be provided as needed.

In an alternative embodiment, as shown in FIG. 8, the heating and cooling ducts, that extend perpendicular to the length of the apparatus, allow cooling or heating fluids to pass through the walls of the dual-chamber mixing device 80 through conduits 82, 84. Any number of conduits may be provided as needed.

Figure 9:
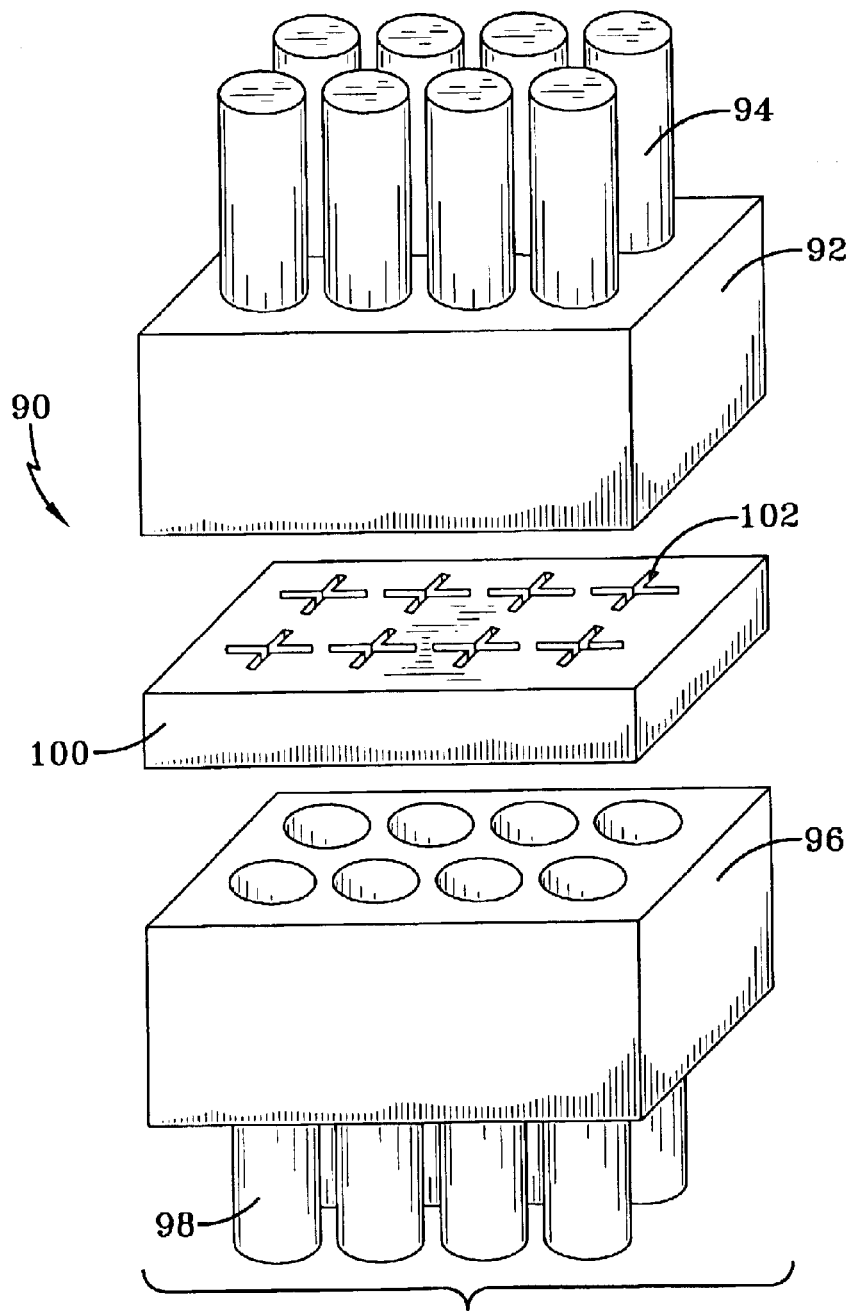
FIG. 9 is a plurality of mixing apparatuses combined together in accordance with the present invention.

In a further alternative embodiment, as shown in FIG. 9, the dual-chamber mixing device 90 can include an upper block 92 with a plurality of upper pressure chambers 94 and a lower block 96 with a plurality of lower pressure chambers 98. A nozzle block 100, having a plurality of nozzle orifices 102 is disposed between the upper block 92 and the lower block 96 so that each of the upper and lower pressure chambers are aligned with an orifice disposed therebetween. All of the details of the pistons and the nozzle block as discussed with respect FIGS. 1–7 apply to this embodiment.

Figure 10:
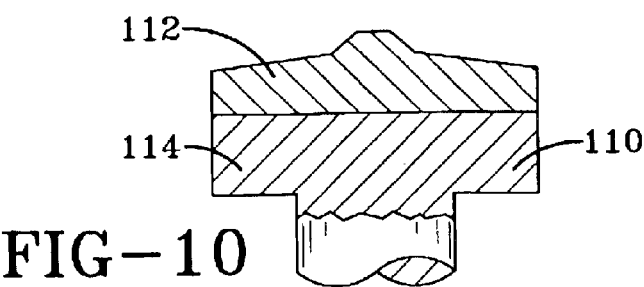
FIG. 10 is a cross sectional view through an alternative embodiment of a piston constructed of two different materials.

In FIG. 10, there is shown an alternative embodiment of a piston 110, which corresponds to pistons 22 and 44 as described hereinbefore, but with the addition of a piston end 112 being formed of a metal such as brass, which expands when it heats up as compared with the remainder of the piston, which can be formed of a material that does not expand as much as the tip, such as stainless steel. This provides additional sealing with the walls of the pressure chambers and prevents the mixture from leaking between the walls of the pressure chambers and the sides of the piston.

The invention has been illustrated and described in a manner that should be considered as exemplary rather than restrictive in character—it being understood that only preferred embodiments have been shown and described, and that all changes and modifications that come within the spirit of the invention are desired to be protected. Undoubtedly, many other "variations" on the techniques set forth hereinabove will occur to one having ordinary skill in the art to which the present invention most nearly pertains, and such variations are intended to be within the scope of the invention, as disclosed herein.

What is claimed is:

1. A method for mixing a polymer with an agglomerates of one or more compounds comprising the steps of:
   disposing an amount of the polymer and amount of the agglomerates of the one or more compounds into one of opposed pressure cylinders;
   providing a nozzle block located between the opposed pressure cylinders and being formed with at least one duct of non-circular cross section establishing communication between the cylinders;
   moving the pistons to force the polymer with the one or more agglomerates of the compound from the one of a pair of opposed pressure cylinders into the other opposed cylinder and back so that the agglomerates of the compound are broken up and dispersed throughout the polymer; and
   removing the polymer with the broken up agglomerates dispersed there through from one of the pair of opposed cylinders; and further
   including the step of breaking up the agglomerates of the compound until at least about 90% of the agglomerates are at a size of less than about 26 microns.

2. The method of claim 1 including the step of selecting the agglomerate from the group comprising carbon black, silica, clay, and talc.

3. The method of claim 1 including the step of selecting the polymer from the group comprising elastomer, rubber and thermoplastic.

4. The method of claim 1 including the step of breaking up the agglomerates of the compound until at least about 95% of the agglomerates are at a size of less than about 26 microns;

5. The method of claim 1 including the step of breaking up the agglomerates of the compound until at least about 90% of the agglomerates are at a size of less than about 10 microns.

6. The method of claim 5 including the step of breaking up the agglomerates of the compound until at least about 95% of the agglomerates are at size to a size of less than about 10 microns.

7. The method of claim 1 including the step of disposing a ratio of about 10 parts of polymer to about 1 part of the agglomerates into the one of a pair of opposed pressure cylinders.

8. The method of claim 1 including the step of disposing a ratio of up to 1 part of polymer to about 1 part of the agglomerates into the one of a pair of opposed pressure cylinders.

9. Apparatus for mixing a mixture of a polymer with an agglomerates of one or more compounds, comprising:
   a pair of pressure chamber that are separated from each other by a nozzle block having a nozzle orifice, a piston reciprocally disposed in each of the pressure chambers to force the mixture from one of the pressure chambers through the nozzle orifice and into the other pressure chamber;
   each of the pistons having a forward surface with an outer portion of the surface disposed at an angle C of between about 0.5 degrees and about 40 degrees with respect to a line perpendicular line to a centerline extending through the pistons; the nozzle orifice having a material flow surface that surfaces extending at an angle A between about 0.5 degrees and about 40 degrees with respect to a line perpendicular line to a centerline extending through the pair of pressure chambers whereby the material flow surfaces abut against an entrance surface of the orifice; and
   wherein the nozzle orifice has an entrance surfaces between the material flow surfaces and through slots forming the orifice extending between the pressure chambers, wherein entrance surfaces form an angle B with respect to the centerline, where angle B is between about 15 degrees and about 60 degrees.

10. Apparatus of claim 9 wherein the outer portion of the surface of forward surfaces have a central protuberance shaped as a truncated cone with a flat outer face, and a conically shaped wall that is disposed at an angle D between about 15 degrees and about 60 degrees.

* * * * *